United States Patent
Lu et al.

(10) Patent No.: US 12,060,648 B2
(45) Date of Patent: Aug. 13, 2024

(54) GRADIENT METALLIC STRUCTURE AND SURFACE TREATMENT TO PRODUCE A GRADIENT METALLIC STRUCTURE

(71) Applicant: City University of Hong Kong, Hong Kong (HK)

(72) Inventors: Jian Lu, Hong Kong (HK); Yang Yang Li, Hong Kong (HK); Binbin Zhou, Hong Kong (HK); Junda Shen, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 312 days.

(21) Appl. No.: 17/704,042

(22) Filed: Mar. 25, 2022

(65) Prior Publication Data

US 2023/0302561 A1 Sep. 28, 2023

(51) Int. Cl.
| | |
|---|---|
| *C25F 3/14* | (2006.01) |
| *B23H 3/00* | (2006.01) |
| *B23H 3/08* | (2006.01) |
| *B23H 9/00* | (2006.01) |
| *C23F 1/02* | (2006.01) |
| *C23F 4/00* | (2006.01) |
| *C25D 5/00* | (2006.01) |
| *C25D 5/18* | (2006.01) |
| *G01N 21/65* | (2006.01) |

(52) U.S. Cl.
CPC ................. *C25F 3/14* (2013.01); *B23H 3/00* (2013.01); *B23H 3/08* (2013.01); *B23H 9/008* (2013.01); *C23F 1/02* (2013.01); *C23F 4/00* (2013.01); *C25D 5/18* (2013.01); *C25D 5/605* (2020.08); *G01N 21/658* (2013.01)

(58) Field of Classification Search
CPC .. C25F 3/14; C25D 5/605; C25D 5/18; G01N 21/658; C23F 1/02; C23F 1/04; C23F 4/00; B23H 9/008; B23H 3/00
See application file for complete search history.

(56) References Cited

U.S. PATENT DOCUMENTS

| | | | |
|---|---|---|---|
| 7,147,789 B1 * | 12/2006 | Morley | ...................... C23F 1/02 430/5 |
| 11,053,605 B2 | 7/2021 | Zho et al. | |
| 2016/0257011 A1 * | 9/2016 | Pesavento | ............ B26D 1/0006 |

OTHER PUBLICATIONS

CN 108844943 A (trans) (Year: 2018).*
(Continued)

*Primary Examiner* — Nicholas A Smith
(74) *Attorney, Agent, or Firm* — IDEA Intellectual Limited; Margaret A. Burke; Sam T. Yip

(57) ABSTRACT

A method for microengineering a gradient structure on a metal surface. A metal surface including at least first, second, and third metal surface regions is exposed to a metal-removing agent. A portion of surface metal atoms is removed by the metal-removing agent in each of the first, second, and third metal surface regions. Sequential metal removal processes expose only the second and third regions to the metal-removing agent, followed by exposing only the third region to the metal-removing agent. A gradient metal surface is formed having different properties in each of the first, second, and third metal surface regions. In a further aspect, quantitative surface-enhanced Raman spectroscopy may be performed using the treated metal surface. An amount of an analyte is determined based on its position in one of the first, second, or third metal surface regions.

19 Claims, 5 Drawing Sheets

(56) References Cited

OTHER PUBLICATIONS

Steven E. J. Bell, Gallle Charron, Emiliano Corts, Janina Kneipp, Marc Lamy de la Chapelle, Judith Langer, Marek Prochazka, Vi Tran, and Sebastian Schigcker—"Towards Reliable and Quantitative Surface-Enhanced Raman Scattering (SERS): From Key Parameters to Good Analytical Practice", Angew.Chem.Int. Ed. 2020, 59,5454-5462.

Li Tian, Mengke Su, Fanfan Yu1, Yue Xu, Xiaoyun Li, Lei Li, Honglin Liu , Weihong Tan—"Liquid-state quantitative SERS analyzer on self-ordered metal liquid-like plasmonic arrays" Nature Communications | (2018) 9:3642 | DOI: 10.1038/s41467-018-05920-z.

* cited by examiner

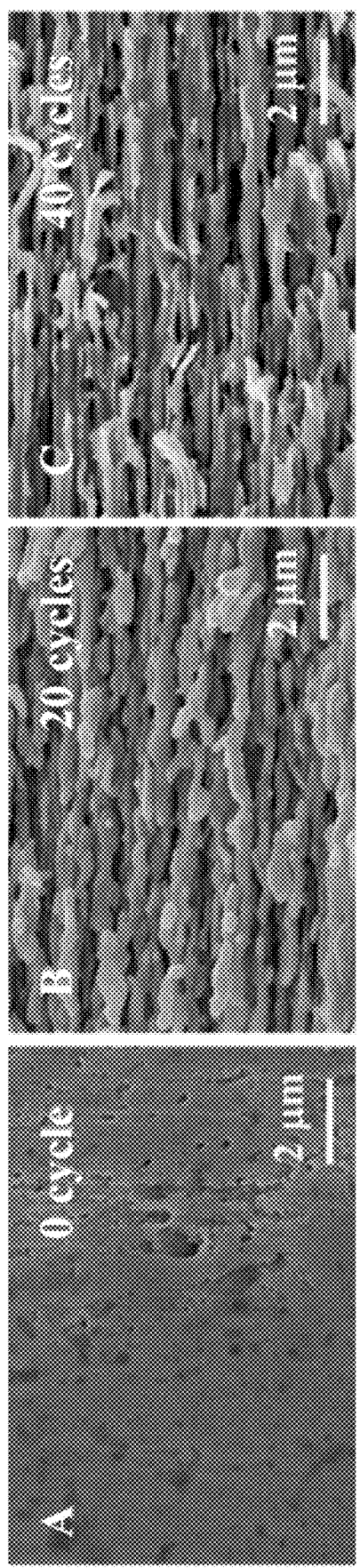
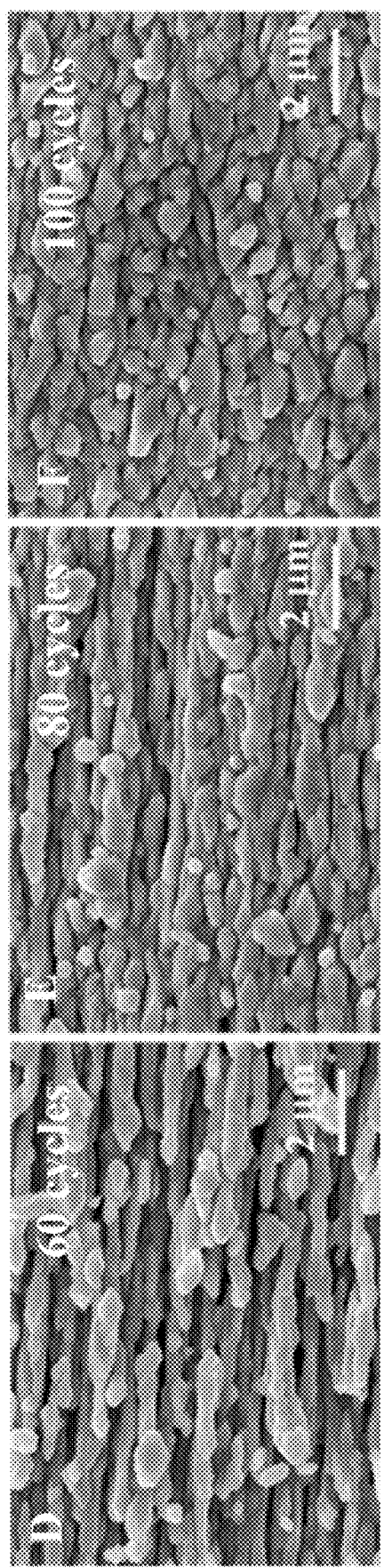
FIG. 3A  FIG. 3B  FIG. 3C
FIG. 3D  FIG. 3E  FIG. 3F

GRADIENT METALLIC STRUCTURE AND SURFACE TREATMENT TO PRODUCE A GRADIENT METALLIC STRUCTURE

TECHNICAL FIELD

The present invention relates to gradient metallic structures and, more particularly, to gradient metallic structures produced through surface treatments and their uses in surface-enhanced Raman spectroscopy.

BACKGROUND

Surface-enhanced Raman spectroscopy (SERS) as a powerful qualitative analysis method has been widely applied in fields such as food safety, healthcare, public safety, law enforcement and environmental analysis by ultrasensitive and fast detection of prohibited additive, antibiotic, pesticides, explosives, drugs and pollutants. However, quantitative analysis is a great challenge for SERS. This is because SERS relies on an inherently near-field phenomenon; only those molecules make a significant contribution to the overall SERS signal. Further, SERS enhancement also strongly depends on the distance between the analyte and the SERS substrate.

Presently, the most common quantitative method is to obtain a quantitative curve through linear simulation by prefabricating a very uniform SERS substrate and employing internal standard (IS) tags to calibrate the SERS fluctuation. However, the methods for controlling fine nanostructures and uniform internal distributions are often complex and time-consuming. Therefore, there is a need in the art for SERS substrates that can perform quantitative detection. The present invention addresses this need.

SUMMARY OF THE INVENTION

The present invention provides a cost-effective and mass production-capable method for effectively treating metal surfaces to produce controllable gradient topological nanostructures. The treated metal surfaces may be used as substrates for surface-enhanced Raman spectroscopy (SERS) quantitative detection.

In one aspect, the present invention provides a method for microengineering a gradient structure on a metal surface. A metal surface including at least first, second, and third metal surface regions is exposed to a metal-removing agent. A portion of surface metal atoms is removed by the metal-removing agent in each of the first, second, and third metal surface regions. Next, the second and third metal surface regions are exposed to the metal-removing agent while not exposing the first metal surface region to the metal-removing agent. A portion of metal atoms is removed by the metal-removing agent in each of the second and third metal surface regions.

Next, the metal surface including the third metal surface region is exposed to the metal-removing agent while not exposing the first and second metal surface regions to the metal-removing agent. A gradient metal surface is formed having different properties in the first, second, and third metal surface regions.

In a further aspect, quantitative surface-enhanced Raman spectroscopy may be performed using the treated metal surface that includes the three different metal surface regions. An amount of an analyte is determined based on its position in one of the first, second, or third metal surface regions.

In a further aspect, the metal-removing agent is a chemical metal-removing agent.

In a further aspect, the metal-removing agent is an electrochemical metal-removing agent.

In a further aspect, the metal-removing agent is a plasma metal-removing agent.

In a further aspect, the metal surface is selected from a metal surface including silver, gold, copper, iron, aluminum, nickel, or alloy thereof.

In a further aspect, the metal surface is a metal surface of a needle, rod, wire, foil, mesh, or foam.

In a further aspect, a concentration of the electrochemical metal-removing agent is adjusted between subsequent exposures.

In a further aspect, a pH of the electrochemical metal-removing agent is adjusted between subsequent exposures.

In a further aspect, wherein a temperature of the electrochemical metal-removing agent is adjusted between subsequent exposures.

In a further aspect, the electrochemical metal-removing agent is an electrolyte in an electrochemical cell including two electrodes and in which the metal surface forms a portion of one the electrodes.

In a further aspect, the electrolyte includes an acid including $HNO_3$, $HCl$, or $H_2SO_4$.

In a further aspect, an anode current is applied to the metal surface for a time duration to cause metal removal and a cathodic current for a time duration to cause electrodeposition, and wherein a metal removal/electrodeposition cycle is repeated for n cycles until a first surface nanostructure is obtained.

In a further aspect, the time duration is 1-100 seconds.

In a further aspect, the n is 5-100 cycles.

In a further aspect, the anode and cathode current is 5-100 mA.

In a further aspect, the gradient metal surface formed having different properties include different metal particle sizes.

In a further aspect, the gradient metal surface formed having different properties include different hole sizes.

In a further aspect, the gradient metal surface formed having different properties include different hydrophilic and hydrophobic regions.

BRIEF DESCRIPTION OF THE DRAWINGS

FIGS. 3A-3F are SEM images of a silver needle with different numbers of cycles of electrochemical treatment, (FIG. 3A) 0 cycles, (FIG. 3B) 20 cycles, (FIG. 3C) 40 cycles, (FIG. 3D) 60 cycles, (FIG. 3E) 80 cycles, (FIG. 3F) 100 cycles.

FIG. 4A shows SERS spectra of the $10^{-10}$ M R6G from different regions with different numbers of electrochemical cycles. FIG. 4B shows SERS intensity corresponding to different areas from FIG. 4A. FIG. 4C shows SERS spectra of the $10^{-11}$ M R6G from different regions with different numbers of electrochemical cycles. FIG. 4D shows SERS intensity corresponding to different areas from FIG. 4C.

DETAILED DESCRIPTION

Figure 1:
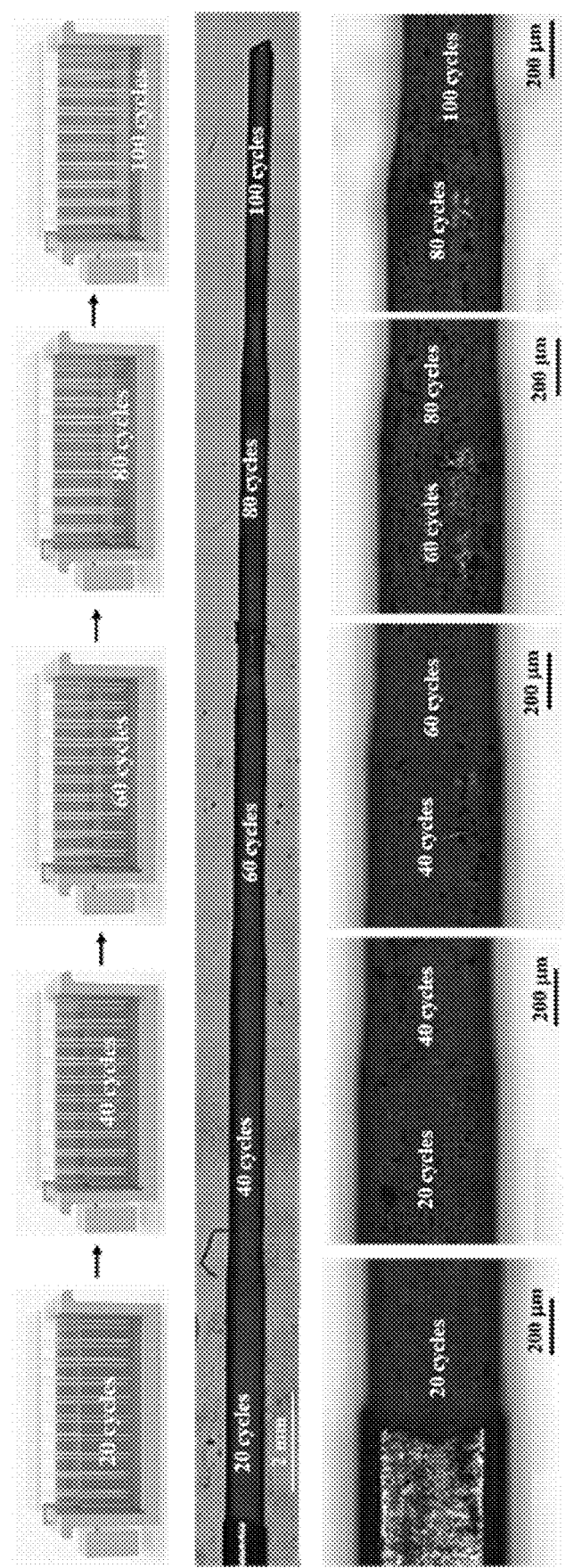
FIG. 1 shows a schematic representation (top portion) of a method for surface treatment to form a gradient metallic structure and an optical microscope picture of an entire treated-gradient metallic structure for a silver needle (middle portion) while the lower portion shows a magnified optical photograph of each segment.

The present invention provides a novel gradient metallic structure and a novel surface treatment for producing such gradient metallic structure. Compared to homogenous structures, gradient structures possess desirable functionalities such as excellent strength and ductility. However, it is a challenge to produce a gradient metallic structure in an efficient and controllable manner, particularly is mass production environments.

Accordingly, the present invention provides a simple, low-cost and readily automated method for microengineering a metal surface that can be used as an economical SERS substrate for quantitative analysis. By providing a gradient structure on the metal surface. The detection limits of the gradient structure are different in different positions; as a result, the target molecules in an analyte can be quantified through the detection positions gradient metal surface.

In one aspect, the method for microengineering a gradient structure on a metal surface includes exposing a metal surface that includes at least first, second, and third metal surface regions to a metal-removing agent. A portion of metal atoms is selectively removed by the metal-removing agent in each of the first, second, and third metal surface regions.

Next, the second and third metal surface regions are exposed to the metal-removing agent while not exposing the first metal surface region to the metal-removing agent. A portion of metal atoms is selectively removed by the metal-removing agent in each of the second and third metal surface regions (while not removing any metal atoms in the first region).

The third metal surface region is then exposed to the metal-removing agent while not exposing the first and second metal surface region to the metal-removing agent. A portion of metal atoms is selectively removed by the metal-removing agent in the third metal surface region (while not removing any metal atoms in the first and second regions). In this manner, a gradient metal surface is formed having different properties in each of the first, second, and third metal surface regions.

A variety of metal-removing agents may be used in the present invention. For example, chemical, electrochemical, or plasma-based metal-removing agents may be used.

In one aspect, when an electrochemical metal-removing agent is used, an electrochemical cell may be formed with an anode and a cathode immersed in the electrolyte. The metal surface to be treated may be used as the anode or the metal surface may be positioned on an anode.

In order to provide the sequential exposure to different regions of the metal surface, the metal surface may be partially withdrawn from the electrolyte or the electrolyte level may be lowered as sequential surface treatments are performed. In this manner, the first region is not in contact with the electrolyte during the second treatment and the second region is not in contact with the electrolyte during the third treatment. The electrolyte level or the amount that a metal surface is removed from the electrolyte may be the same of different between sequential treatments, depending upon the desired gradient structure on the metal surface. Further additional treatments may be performed such that an arbitrary number of treated regions may be formed to create the desired gradient structure; that is, the present invention is not limited to sequential treatment of three regions.

Alternatively, the sequential exposure may be to an electrolyte having a different concentration, pH, temperature, or combination of these factors. Different current levels may also be applied. These factors result in increased or decreased metal removal rates, depending upon the final desired morphology.

The electrolyte may include an acid. such as $HNO_3$, HCl, or $H_2SO_4$. An anode current may be applied for a time duration to etch away surface metal atoms from the metal material and a cathodic current for a time duration to initiate electrodeposition. The etching/electrodeposition may be repeated for n cycles until the desired first surface nanostructure is obtained. The time duration may be for approximately 1-100 seconds for n equal to 5-100 cycles. The applied current may be from 5-100 mA.

Alternatively, for sequential exposure to another type of chemical etchant such as a plasma-based etchant, portions of the metal surface may be gradually exposed through use of a mask that covers treated regions or gradually uncovers untreated regions. Masking may be accomplished using contact masks such as photoresists or non-contact masks, such as covers that are positioned over the regions that are not to be exposed to a given treatment cycle.

The techniques of the present invention can be applied to a variety of metal surfaces. Examples of metals that may be used include silver, gold, copper, iron, aluminum, nickel, or alloys. Further, the metal surface may take a variety of forms including needle, rod, wire, foil, mesh, or foam shapes.

The metal surfaces formed according to the methods described above may be used for performing quantitative surface-enhanced Raman spectroscopy; an amount of an analyte may be determined based on its position in one of the first, second, or third metal surface regions. This is due to the different surface morphologies formed in each of these three regions, including grain size, surface porosity, etc. That is, a rougher nanostructure for regions exposed to a greater amount of material removal/more metal removal/etching cycles, can amplify the Raman signal and increase the limit of detection (LOD) of molecules in the analyte. In general, the different treated regions will have different particle/grain sizes, hole sizes of different diameters and, optionally, regions that differ in their level of hydrophobicity or hydrophilicity.

Figure 2:
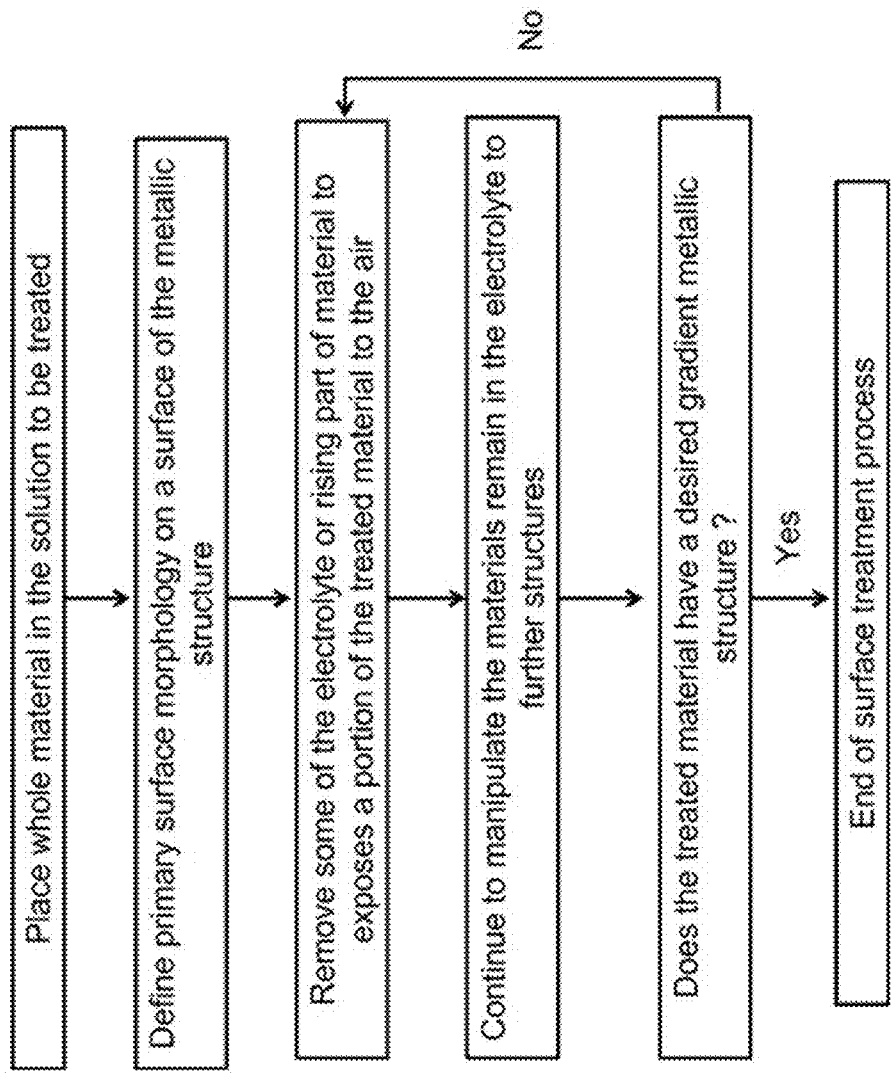
FIG. 2 is a flow diagram showing a general method for surface treatment of a gradient metallic structure in accordance with one embodiment of the present invention.

FIG. 2 provides a flow chart for the embodiment in which electrochemical metal-removal agents are used to provide the gradient structure. In FIG. 2, silver metal needles are used for electrochemical treatment with the results depicted in FIG. 1. Initially, the entire needle is placed in the solution to be treated, thus defining a primary surface morphology on surface of the metallic structure. Some of the electrolyte is removed or a portion of the needle is withdrawn from immersion in the solution; the remaining portion continues to be treated forming a gradient between the material exposed to the electrolyte and the material not exposed to the electrolyte. The process is repeated, that is, lowering the electrolyte level or gradually withdrawing the needle from the electrolyte until a desired gradient is formed.

As shown in the FIG. 1, different numbers of repeated cycles greatly influence the surface morphology of the silver needle. The original surface morphology of the silver needle is smooth (see the SEM image of FIG. 3A); as such, the silver needle cannot be directly used as a SERS substrate, because the amplification of Raman signal requires a rough surface morphology. As the number of cycles increases, the surface nanostructure of the needle becomes smaller. More and smaller nanostructures can provide more adsorption sites for molecules being measured in an analyte. Notably, the enhancement of the Raman spectrum can be tuned by interparticle plasmonic coupling to generate electromagnetic hotspots among neighboring nano structures. Therefore, having smaller and greater numbers of nanostructures, resulting from increased number of electrochemical treatment cycles, can produce more hotspots to enhance the Raman signal. Thus, the SERS intensity corresponds to the corresponding gradient microstructure of the silver needle surface.

The surface microstructure corresponding to the different numbers of treatment cycles are depicted in FIGS. 3A-3F. As can be seen in these FIGS., the surface morphology gradually increases in surface roughness and increased porosity as the number of cycles increases from 20 cycles (FIG. 3B) up to 100 cycles (FIG. 3F).

Figures 4A, 4B:
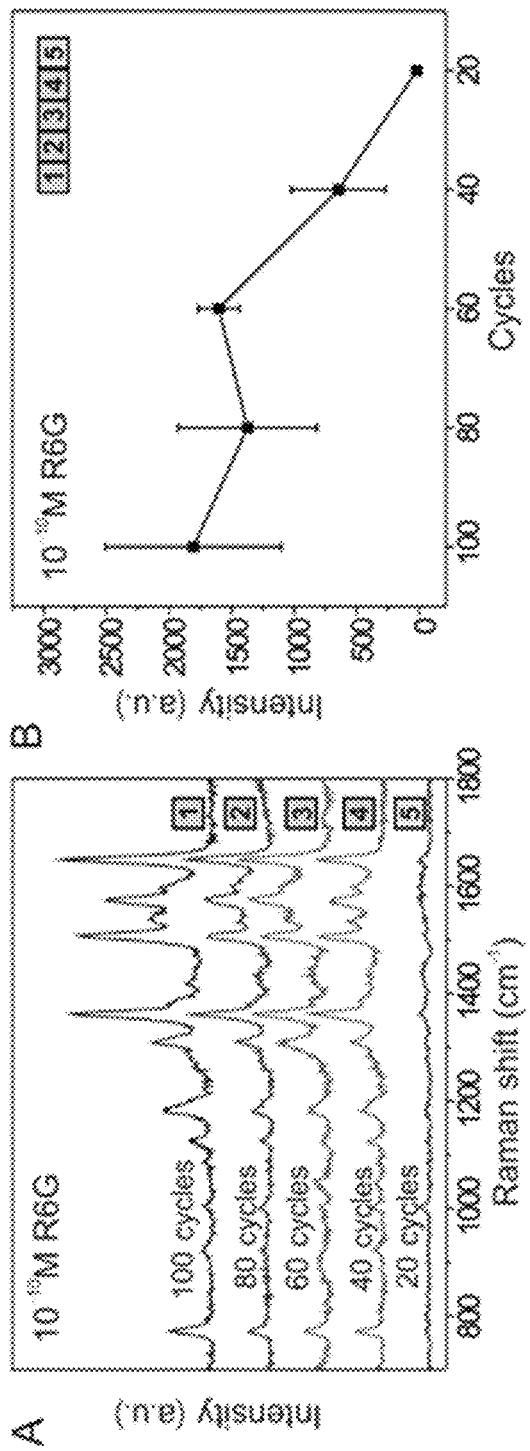
FIGS. 4A-4D show SERS spectra and intensity plots.
Figures 4C, 4D:
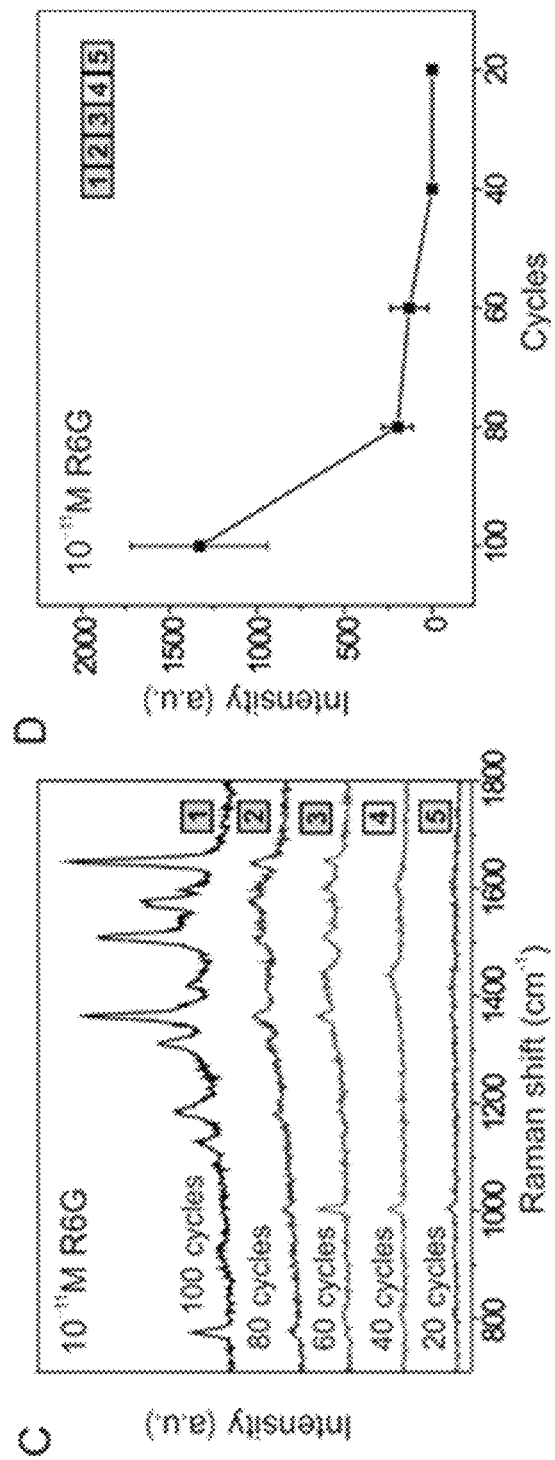

The gradient nanostructure silver needle can provide a new strategy for the SERS quantitative detection. As shown in FIG. 4C, the SERS spectra of a $10^{-11}$ M rhodamine 6G dye (R6G) were obtained from different areas with different numbers of cycles of the treated silver needle. A significant signal is obtained for the region with 40 treatment cycles areas whereas the region with 20 treatment cycles areas does not produce a significant signal. Thus, the limit of detection (LOD) and the structure of the silver needle surface correspond to the gradient distribution. As such, a target concentration can be derived by the position of the LOD on the gradient surface of the silver needle. Using R6G, for example, the SERS spectrum of $10^{-10}$ M R6G can obtained in the 40 cycle treatment region (FIGS. 4A, 4B) while a SERS signal of $10^{-11}$ M R6G can only obtained in the 60 cycle treatment region (FIGS. 4C, 4D). Consequently, if the LOD for R6G occurs in the 40 cycle treatment region of the gradient silver needle, it indicates a concentration of $10^{-10}$ M, while a LOD in the 60 cycle treatment region indicates a concentration of $10^{-11}$ M. This type of calibration can be made for a variety of analytes to facilitate the quantitative analysis.

EXAMPLES

To micro-engineer the gradient microstructure of the silver needle of FIG. 1, an automated procedure "one-pot" procedure is performed involving repetitive electrochemical treatment cycles and removing a portion of the electrolyte or using a programmed lifting platform. As shown in FIG. 1, the electrochemical treatment was carried out at room temperature using a computer controlled potential at in a two-electrode electrochemical cell, with a platinum electrode, and the silver needle as the working electrode. An aqueous solution of 0.5 M nitric acid was used as the electrolyte. Prior to roughening, the commercial silver acupuncture needle was soaked in acetone and ultrasound applied for 5 minutes to remove any organic matter from the surface. A current square-wave was applied which periodically modulated between two extreme values for n cycles: an anode current A1 for a time duration t1 was applied for etching silver and any impurities on the surface of the silver acupuncture needle, and a cathodic current A2 for a time duration t2 for selective electrodeposition of silver (using the top level of FIG. 1, for example, A1=0.04 A, A2=-0.04 A, t1=t2=5 s, and n=20).

After the first electrochemical treatment, a programmed lifting platform advances by C (in the figure, C=2 mm). At this point, one part of the treated needle is exposed to air while the other remains immersed in the electrolyte. The first electrochemical process is repeated to treat the regions of the needle that remain immersed in the electrolyte. As a result, the region of the treated needle in the electrolyte underwent 40 cycles of etching and electrodeposition compared to 20 cycles for the part exposed to air. Continuing to lower the position of the electrolyte relative to the needle and repeat the first electrochemical process. The part of treated needle exposed to air has been divided into two sections, 20 cycles and 40 cycles, while the part still in the electrolyte undergoes 60 cycles. Therefore, a gradient nanostructured silver needle as show in FIG. 1 is obtained.

INDUSTRIAL APPLICABILITY

A simple, low-cost and automated method for nano structuring metal surfaces that can be used as SERS substrates is provided. For electrochemical-based metal-removing agents, gradient structures can be obtained by means of a programmed lifting platform. By controlling the distance and time of descent of the lifting platform to conduct sequential electrochemical treatments of metal surfaces, a selected gradient structure may be formed. Therefore, the detection limits of the metal surface are different in different positions along the surface and target molecules in an analyte can be quantified through the detection positions treated metal surface. The structural features of the product can be easily adjusted by modifying the electrochemical parameters. The present invention can be automated without expensive equipment and is suitable for industry-scale mass production. Currently, with no quantitative SERS substrate commercially available, techniques for performing quantitative SERS are extremely complex and not suitable for mass production.

The potential applications provided by metal substrates with controllable gradient topological nanostructures are far-reaching and wide-ranging. For example, it is necessary to continually monitor blood glucose levels for individuals with diabetes. The classical methods for blood glucose monitoring are performed by blood extraction from a finger prick which is then analyzed by an electrochemical sensor. However, it is very uncomfortable for patients to undergo repeated finger pricks throughout the day. Use of the metal substrates combined with SERS techniques has potential for ultrasensitive characterization. Since no quantitative SERS substrates are commercially available, this greatly restricts the application of SERS to blood glucose detection. The present gradient nanostructured silver needles provide a possible strategy for the SERS quantitative detection of blood glucose and have great potential in ultrasensitive quantitative detection of many analytes.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

Several embodiments of the present disclosure and features of details are briefly described above. The embodiments described in the present disclosure may be easily used as a basis for designing or modifying other processes and structures for realizing the same or similar objectives and/or obtaining the same or similar advantages introduced in the embodiments of the present disclosure. Such equivalent construction does not depart from the spirit and scope of the present disclosure, and various variations, replacements, and modifications can be made without departing from the spirit and scope of the present disclosure.

The invention claimed is:

1. A method for microengineering a gradient structure on a metal surface comprising:
    exposing a metal surface including at least first, second, and third metal surface regions to a metal-removing agent;
    selectively removing a portion of metal atoms by the metal-removing agent in each of the at least first, second, and third metal surface regions;
    exposing the metal surface including the second and third metal surface regions to the metal-removing agent while not exposing the first metal surface region to the metal-removing agent;
    selectively removing a portion of metal atoms by the metal-removing agent in each of the second and third metal surface regions;
    exposing the metal surface including the third metal surface region to the metal-removing agent while not exposing the first and second metal surface region to the metal-removing agent such that a gradient metal surface is formed having different properties in the first, second, and third metal surface regions.

2. The method according to claim 1, wherein the metal-removing agent is a chemical metal-removing agent.

3. The method according to claim 1, wherein the metal-removing agent is an electrochemical metal-removing agent.

4. The method according to claim 1, wherein the metal-removing agent is a plasma metal-removing agent.

5. The method according to claim 1, wherein the metal surface is selected from a metal surface including silver, gold, copper, iron, aluminum, nickel, or alloy thereof.

6. The method according to claim 1 wherein the metal surface is a metal surface of a needle, rod, wire, foil, mesh, or foam.

7. The method according to claim 3, wherein a concentration of the electrochemical metal-removing agent is adjusted between subsequent exposures.

8. The method according to claim 3, wherein a pH of the electrochemical metal-removing agent is adjusted between subsequent exposures.

9. The method according to claim 3, wherein a temperature of the electrochemical metal-removing agent is adjusted between subsequent exposures.

10. The method according to claim 3, wherein the electrochemical metal-removing agent is an electrolyte in an electrochemical cell including two electrodes and in which the metal surface forms a portion of one the electrodes.

11. The method according to claim 10, wherein electrolyte includes an acid including $HNO_3$, $HCl$, or $H_2SO_4$.

12. The method according to claim 10, wherein an anode current is applied to the metal surface for a time duration to cause metal removal and a cathodic current for a time duration to cause electrodeposition, and wherein a metal removal/electrodeposition cycle is repeated for n cycles until a first surface nanostructure is obtained.

13. The method according to claim 12 wherein the time duration is 1-100 seconds.

14. The method according to claim 12, wherein the n is 5-100 cycles.

15. The method according to claim 12, wherein the anode and cathode current is 5-100 mA.

16. The method according to claim 1, the gradient metal surface formed having different properties include different metal particle sizes.

17. The method according to claim 1, the gradient metal surface formed having different properties include different hole sizes.

18. The method according to claim 1, the gradient metal surface formed having different properties include different hydrophilic and hydrophobic regions.

19. A method for performing quantitative surface-enhanced Raman spectroscopy comprising providing a metal surface according to the process of claim 1 and determining an amount of an analyte based on its position in one of the first, second, or third metal surface regions.

* * * * *